US010959045B2

(12) United States Patent
Lubeck et al.

(10) Patent No.: US 10,959,045 B2
(45) Date of Patent: Mar. 23, 2021

(54) METHOD FOR REQUESTING TRANSPORTATION SERVICES

(71) Applicant: Lyft, Inc., San Francisco, CA (US)

(72) Inventors: Olaf Martin Lubeck, Santa Fe, NM (US); John H. Hall, Alexandria, VA (US)

(73) Assignee: LYFT, INC., San Francisco, CA (US)

( * ) Notice: Subject to any disclaimer, the term of this patent is extended or adjusted under 35 U.S.C. 154(b) by 0 days.

(21) Appl. No.: 15/986,784

(22) Filed: May 22, 2018

(65) Prior Publication Data

US 2018/0268714 A1 Sep. 20, 2018

Related U.S. Application Data

(63) Continuation of application No. 15/470,553, filed on Mar. 27, 2017, now Pat. No. 9,984,575, which is a (Continued)

(51) Int. Cl.
*H04W 4/02* (2018.01)
*H04W 4/029* (2018.01)
(Continued)

(52) U.S. Cl.
CPC ........ *H04W 4/023* (2013.01); *G01C 21/3667* (2013.01); *G06Q 50/30* (2013.01); *G08G 1/123* (2013.01); *G08G 1/202* (2013.01); *G08G 1/205* (2013.01); *H04L 61/605* (2013.01); *H04L 67/26* (2013.01); *H04M 1/0202* (2013.01); *H04W 4/02* (2013.01); *H04W 4/029* (2018.02); *H04W 4/12* (2013.01); *H04W 8/24* (2013.01); *H05K 999/99* (2013.01); *G01S 13/46* (2013.01); *G01S 19/13* (2013.01); *G01S 2013/468* (2013.01);
(Continued)

(58) Field of Classification Search
CPC ......... H04W 4/028; H04W 4/02; H04W 4/12; H04W 8/22; H04W 8/24; G08G 1/202
USPC ...................... 455/404.2, 407, 456.1, 456.3, 455/456.5–456.6, 457; 705/5, 6, 13
See application file for complete search history.

(56) References Cited

U.S. PATENT DOCUMENTS 4,360,875 A 11/1982 Behnke
5,724,243 A 3/1998 Westerlage et al.
(Continued)

FOREIGN PATENT DOCUMENTS

CA 2212330 9/2003
EP 2065867 A1 6/2009
(Continued)

OTHER PUBLICATIONS

International Search Report for PCT/US09/30154, International Searching Authority, dated Feb. 23, 2009, pp. 1-8.
(Continued)

*Primary Examiner* — Congvan Tran
(74) *Attorney, Agent, or Firm* — Keller Jolley Preece

(57) ABSTRACT

A method for safely and efficiently requesting transportation services through the use of mobile communications devices capable of geographic location is described. Individual and package transportation may be provided. New customers may be efficiently serviced, and the requester and transportation provider locations may be viewed in real time on the mobile devices.

20 Claims, 3 Drawing Sheets

Related U.S. Application Data continuation of application No. 15/446,991, filed on Mar. 1, 2017, now Pat. No. 9,826,362, which is a continuation of application No. 15/429,779, filed on Feb. 10, 2017, now Pat. No. 9,723,447, which is a continuation of application No. 15/177,762, filed on Jun. 9, 2016, now Pat. No. 9,646,500, which is a continuation of application No. 14/745,346, filed on Jun. 19, 2015, now Pat. No. 9,392,418, which is a continuation of application No. 13/413,492, filed on Mar. 6, 2012, now Pat. No. 9,094,787, which is a continuation of application No. 12/348,850, filed on Jan. 5, 2009, now Pat. No. 8,131,307.

(60) Provisional application No. 61/027,508, filed on Feb. 11, 2008, provisional application No. 61/009,839, filed on Jan. 3, 2008.

(51) Int. Cl.

| | | |
|---|---|---|
| *H04W 8/24* | (2009.01) | |
| *G08G 1/00* | (2006.01) | |
| *H04W 4/12* | (2009.01) | |
| *G01C 21/36* | (2006.01) | |
| *G06Q 50/30* | (2012.01) | |
| *H04L 29/12* | (2006.01) | |
| *H04M 1/02* | (2006.01) | |
| *G08G 1/123* | (2006.01) | |
| *H04L 29/08* | (2006.01) | |
| *H04W 8/22* | (2009.01) | |
| *H04W 84/04* | (2009.01) | |
| *G01S 13/46* | (2006.01) | |
| *G01S 19/13* | (2010.01) | |

(52) U.S. Cl.
CPC ..... *G06Q 2240/00* (2013.01); *H04M 2250/10* (2013.01); *H04W 8/22* (2013.01); *H04W 84/042* (2013.01)

(56) References Cited

U.S. PATENT DOCUMENTS

| | | | |
|---|---|---|---|
| 5,945,919 A | 8/1999 | Trask | |
| 5,953,706 A | 9/1999 | Patel | |
| 5,973,619 A | 10/1999 | Paredes | |
| 6,006,159 A | 12/1999 | Schmier et al. | |
| 6,014,430 A | 1/2000 | Gosney | |
| 6,240,362 B1 | 5/2001 | Gaspard, II | |
| 6,356,838 B1 | 3/2002 | Paul | |
| 6,414,635 B1 | 7/2002 | Stewart et al. | |
| 6,631,322 B1 | 10/2003 | Arthur et al. | |
| 6,697,730 B2 | 2/2004 | Dickerson | |
| 6,756,913 B1 | 6/2004 | Ayed | |
| 6,925,381 B2 | 8/2005 | Adamczyk | |
| 6,992,598 B2 | 1/2006 | Poltorak | |
| 7,064,681 B2 | 6/2006 | Horstemeyer | |
| 7,191,057 B2 | 3/2007 | Adamczyk | |
| 7,363,319 B2 | 4/2008 | Cappellini | |
| 7,394,386 B2 | 7/2008 | Nowlan | |
| 7,463,879 B2 | 12/2008 | Miller | |
| 7,479,901 B2 | 1/2009 | Horstemeyer | |
| 7,482,952 B2 | 1/2009 | Horstemeyer | |
| 7,538,691 B2 | 5/2009 | Horstemeyer | |
| 7,587,276 B2 | 9/2009 | Gold et al. | |
| 7,706,808 B1 | 4/2010 | Aggarwal et al. | |
| 7,751,971 B2 | 7/2010 | Chang | |
| 7,840,027 B2 | 11/2010 | Moroo et al. | |
| 7,870,560 B2 | 1/2011 | Fong et al. | |
| 7,957,871 B1 | 6/2011 | Echeruo | |
| 8,005,488 B2 | 8/2011 | Staffaroni et al. | |
| 8,131,307 B2 | 3/2012 | Lubeck et al. | |
| 8,160,808 B2 | 4/2012 | Sprigg | |
| 8,224,571 B2 | 7/2012 | Huang et al. | |
| 8,340,904 B2 | 12/2012 | Lin | |
| 8,639,579 B2 | 1/2014 | Kalevik et al. | |
| 8,798,593 B2 | 8/2014 | Haney | |
| 8,798,647 B1 | 8/2014 | Haney | |
| 9,031,581 B1 | 5/2015 | Haney | |
| 9,094,787 B2 | 7/2015 | Lubeck et al. | |
| 9,392,418 B2 | 7/2016 | Lubeck et al. | |
| 9,646,500 B2 | 5/2017 | Lubeck et al. | |
| 9,723,447 B2 | 8/2017 | Lubeck et al. | |
| 9,826,362 B2 | 11/2017 | Lubeck et al. | |
| 9,984,575 B2 | 5/2018 | Lubeck et al. | |
| 2001/0056396 A1 | 12/2001 | Goino | |
| 2002/0004703 A1 | 1/2002 | Gaspard, II | |
| 2002/0034292 A1 | 3/2002 | Tuoriniemi et al. | |
| 2002/0080048 A1 | 6/2002 | Choi | |
| 2002/0099599 A1 | 7/2002 | Minassian | |
| 2003/0001779 A1 | 1/2003 | Mintz et al. | |
| 2003/0037110 A1 | 2/2003 | Yamamoto | |
| 2003/0046146 A1 | 3/2003 | Westerman | |
| 2003/0054837 A1 | 3/2003 | Ennis | |
| 2003/0065556 A1* | 4/2003 | Takanashi | G08G 1/202 |
| | | | 705/13 |
| 2003/0087648 A1 | 5/2003 | Mezhvinsky | |
| 2003/0153330 A1 | 8/2003 | Naghian et al. | |
| 2003/0177020 A1 | 9/2003 | Okamura | |
| 2004/0036622 A1 | 2/2004 | Dukach et al. | |
| 2004/0076280 A1* | 4/2004 | Ando | G08G 1/202 |
| | | | 379/220.01 |
| 2004/0093280 A1 | 5/2004 | Yamaguchi | |
| 2004/0106399 A1 | 6/2004 | Ki | |
| 2004/0158395 A1 | 8/2004 | Yamada et al. | |
| 2004/0177109 A1* | 9/2004 | Lee | G08G 1/202 |
| | | | 709/201 |
| 2004/0219933 A1 | 11/2004 | Faith | |
| 2004/0225600 A1 | 11/2004 | Onodera et al. | |
| 2004/0236502 A1 | 11/2004 | Nozaki et al. | |
| 2004/0243430 A1 | 12/2004 | Horstemeyer | |
| 2004/0249818 A1* | 12/2004 | Isaac | G06Q 10/047 |
| 2005/0004757 A1 | 1/2005 | Neeman et al. | |
| 2005/0014486 A1 | 1/2005 | Shimizu et al. | |
| 2005/0032529 A1 | 2/2005 | Akama | |
| 2005/0033511 A1 | 2/2005 | Pechatnikov et al. | |
| 2005/0038696 A1 | 2/2005 | Kalevik et al. | |
| 2005/0052462 A1 | 3/2005 | Sakamoto et al. | |
| 2005/0153707 A1 | 7/2005 | Ledyard et al. | |
| 2005/0216286 A1 | 9/2005 | Kalinichenko | |
| 2005/0216317 A1 | 9/2005 | Medellin et al. | |
| 2005/0227620 A1 | 10/2005 | Morimoto | |
| 2005/0227704 A1 | 10/2005 | Ferra | |
| 2006/0034201 A1 | 2/2006 | Umeda et al. | |
| 2006/0059023 A1 | 3/2006 | Mashinsky | |
| 2006/0065733 A1* | 3/2006 | Lee | G06F 17/30879 |
| | | | 235/462.01 |
| 2006/0094447 A1 | 5/2006 | Zellner | |
| 2006/0133405 A1 | 6/2006 | Fee | |
| 2006/0135134 A1 | 6/2006 | Mezhvinsky et al. | |
| 2006/0136254 A1 | 6/2006 | Greenstein | |
| 2006/0189297 A1 | 8/2006 | Jung | |
| 2006/0190276 A1 | 8/2006 | Williamson | |
| 2006/0208878 A1 | 9/2006 | Nowlan | |
| 2006/0217885 A1 | 9/2006 | Crady et al. | |
| 2006/0293835 A1 | 12/2006 | Smith et al. | |
| 2007/0010260 A1 | 1/2007 | Zellner | |
| 2007/0011034 A1 | 1/2007 | Jones et al. | |
| 2007/0073552 A1 | 3/2007 | Hileman | |
| 2007/0185744 A1 | 8/2007 | Robertson | |
| 2007/0197231 A1 | 8/2007 | Lin | |
| 2008/0068221 A1 | 3/2008 | Park | |
| 2008/0114629 A1 | 5/2008 | Pavlov | |
| 2008/0158016 A1 | 7/2008 | Wang et al. | |
| 2008/0189226 A1 | 8/2008 | Wurster | |
| 2008/0194260 A1 | 8/2008 | Altberg et al. | |
| 2008/0196024 A1 | 8/2008 | Barfield et al. | |
| 2008/0270204 A1 | 10/2008 | Poykko et al. | |
| 2009/0030885 A1 | 1/2009 | DePasquale et al. | |
| 2009/0037194 A1 | 2/2009 | Roche | |
| 2009/0083111 A1* | 3/2009 | Carr | G06Q 10/047 |
| | | | 705/7.13 |

(56) References Cited

U.S. PATENT DOCUMENTS

| | | | |
|---|---|---|---|
| 2010/0235285 A1 | 9/2010 | Hoffberg | |
| 2011/0039582 A1* | 2/2011 | Kendall | G08G 1/202 455/456.5 |
| 2011/0099040 A1 | 4/2011 | Felt et al. | |
| 2014/0059443 A1 | 2/2014 | Tabe | |
| 2014/0229258 A1 | 8/2014 | Seriani | |
| 2017/0086011 A1 | 3/2017 | Neves | |
| 2017/0141873 A1 | 5/2017 | Mandeville-Clarke | |
| 2017/0309185 A1 | 10/2017 | Lubeck et al. | |
| 2017/0309186 A1 | 10/2017 | Lubeck et al. | |
| 2017/0345315 A1 | 11/2017 | Lubeck et al. | |
| 2017/0345316 A1 | 11/2017 | Lubeck et al. | |
| 2017/0352280 A1 | 12/2017 | Lubeck et al. | |
| 2017/0365174 A1 | 12/2017 | Lubeck et al. | |
| 2018/0268706 A1 | 9/2018 | Lubeck et al. | |
| 2018/0268707 A1 | 9/2018 | Lubeck et al. | |
| 2018/0268708 A1 | 9/2018 | Lubeck et al. | |
| 2018/0268710 A1 | 9/2018 | Lubeck et al. | |
| 2018/0268711 A1 | 9/2018 | Lubeck et al. | |
| 2018/0268712 A1 | 9/2018 | Lubeck et al. | |
| 2018/0268713 A1 | 9/2018 | Lubeck et al. | |
| 2018/0279081 A1 | 9/2018 | Lubeck et al. | |
| 2018/0279082 A1 | 9/2018 | Lubeck et al. | |
| 2018/0279083 A1 | 9/2018 | Lubeck et al. | |
| 2018/0279084 A1 | 9/2018 | Lubeck et al. | |
| 2018/0310132 A1 | 10/2018 | Lubeck et al. | |

FOREIGN PATENT DOCUMENTS

| | | |
|---|---|---|
| EP | 2065867 B1 | 8/2013 |
| JP | 2003-331394 | 11/2003 |
| JP | 2004-110758 | 4/2004 |
| JP | 2009-032136 | 12/2009 |

OTHER PUBLICATIONS

PCT International Preliminary Report on Patentability for PCT Application No. PCT/US2009/030154, 5 pgs. (dated Jul. 6, 2010).
A PSO-GA method to solve a partial shipment and scheduling problem, Cheng Gang, 2010 International Conference on Computer Application and System Modeling (ICCASM 2010) Year: 2010, vol. 10; pp. V10-330-V10-335.
Delivering visual pertinent information services for commuters, Wee Siong Ng; Justin Cheng, 2009 IEEE Asia-Pacific Services Computing Conference (APSCC) Year: 2009; pp. 325-331.
U.S. Appl. No. 12/348,850, dated May 19, 2011, Office Action.
U.S. Appl. No. 12/348,850, dated Oct. 31, 2011, Notice of Allowance.
U.S. Appl. No. 13/413,492, dated Apr. 8, 2014, Office Action.
U.S. Appl. No. 13/413,492, dated Oct. 16, 2014, Office Action.
U.S. Appl. No. 13/413,492, dated Mar. 19, 2015, Notice of Allowance.
U.S. Appl. No. 14/745,346, dated Jul. 13, 2015, Office Action.
U.S. Appl. No. 14/745,346, dated Jan. 20, 2016, Office Action.
U.S. Appl. No. 14/745,346, dated Apr. 25, 2016, Notice of Allowance.
U.S. Appl. No. 14/745,346, dated May 12, 2016, Notice of Allowance.
U.S. Appl. No. 15/177,762, dated Feb. 14, 2017, Office Action.
U.S. Appl. No. 15/177,762, dated Mar. 29, 2017, Notice of Allowance.
U.S. Appl. No. 15/177,762, dated Jun. 1, 2017, Notice of Allowance.
U.S. Appl. No. 15/429,779, dated Apr. 10, 2017, Office Action.
U.S. Appl. No. 15/429,779, dated Jun. 19, 2017, Notice of Allowance.
U.S. Appl. No. 15/446,991, dated Apr. 13, 2017, Office Action.
U.S. Appl. No. 15/446,991, dated Jun. 19, 2017, Office Action.
U.S. Appl. No. 15/446,991, dated Jul. 26, 2017, Office Action.
U.S. Appl. No. 15/446,991, dated Aug. 29, 2017, Notice of Allowance.
U.S. Appl. No. 15/470,553, dated Sep. 1, 2017, Office Action.
U.S. Appl. No. 15/470,553, dated Sep. 28, 2017, Notice of Allowance.
U.S. Appl. No. 15/470,553, dated Jan. 24, 2018, Notice of Allowance.
U.S. Appl. No. 15/646,951, dated Nov. 6, 2017, Office Action.
U.S. Appl. No. 15/646,989, dated Dec. 7, 2017, Notice of Allowance.
U.S. Appl. No. 15/646,989, dated Feb. 8, 2018, Notice of Allowance.
U.S. Appl. No. 15/679,754, dated Feb. 26, 2018, Office Action.
U.S. Appl. No. 15/681,080, dated Mar. 8, 2018, Office Action.
U.S. Appl. No. 15/683,308, dated Mar. 22, 2018, Office Action.
U.S. Appl. No. 15/692,677, dated Nov. 27, 2017, Office Action.
U.S. Appl. No. 15/985,436, dated Jul. 9, 2018, Office Action.
U.S. Appl. No. 15/985,453, dated Aug. 31, 2018, Office Action.
U.S. Appl. No. 15/985,459, dated Sep. 18, 2018, Office Action.
U.S. Appl. No. 15/986,314, dated Sep. 26, 2018, Office Action.
U.S. Appl. No. 15/986,358, dated Sep. 24, 2018, Office Action.
U.S. Appl. No. 15/681,080, dated Oct. 4, 2018, Office Action.
U.S. Appl. No. 15/692,677, dated Jul. 19, 2018, Notice of Allowance.
U.S. Appl. No. 15/985,436, dated Apr. 8, 2019, Office Action.
U.S. Appl. No. 15/985,453, dated Apr. 10, 2019, Office Action.
U.S. Appl. No. 15/985,459, dated Mar. 27, 2019, Office Action.
U.S. Appl. No. 15/985,459, dated May 2, 2019, Office Action.
U.S. Appl. No. 15/986,314, dated Mar. 29, 2019, Notice of Allowance.
U.S. Appl. No. 15/986,358, dated May 7, 2019, Notice of Allowance.
U.S. Appl. No. 15/986,777, dated Apr. 24, 2019, Office Action.
U.S. Appl. No. 15/994,641, dated Feb. 13, 2019, Office Action.
U.S. Appl. No. 15/995,428, dated Feb. 14, 2019, Office Action.
U.S. Appl. No. 15/995,428, dated Apr. 25, 2019, Office Action.
U.S. Appl. No. 15/995,445, dated Mar. 4, 2019, Office Action.
U.S. Appl. No. 15/986,777, dated Nov. 20, 2018, Office Action.
U.S. Appl. No. 15/990,175, dated Nov. 21, 2018, Office Action.
U.S. Appl. No. 15/986,381, dated Nov. 2, 2018, Office Action.
U.S. Appl. No. 15/990,175, dated May 23, 2019, Notice of Allowance.
U.S. Appl. No. 15/986,381, dated Jun. 14, 2019, Office Action.
U.S. Appl. No. 15/994,641, dated Jun. 12, 2019, Notice of Allowance.
U.S. Appl. No. 16/020,138, dated May 9, 2019, Office Action.
U.S. Appl. No. 15/985,436, dated Sep. 17, 2019, Notice of Allowance.
U.S. Appl. No. 15/985,453, dated Aug. 13, 2019, Notice of Allowance.
U.S. Appl. No. 15/995,445, dated Oct. 2, 2019, Office Action.
U.S. Appl. No. 16/518,718, dated Oct. 3, 2019, Office Action.
U.S. Appl. No. 15/985,459, dated Nov. 26, 2019, Office Action.
U.S. Appl. No. 15/986,777, dated Dec. 9, 2019, Office Action.
U.S. Appl. No. 15/986,777, dated Mar. 23, 2020, Notice of Allowance.
U.S. Appl. No. 15/986,381, dated Nov. 29, 2019, Office Action.
U.S. Appl. No. 15/995,428, dated Nov. 13, 2019, Office Action.
U.S. Appl. No. 15/995,445, dated Feb. 25, 2020, Office Action.
U.S. Appl. No. 16/020,138, dated Jan. 2, 2020, Office Action.
U.S. Appl. No. 16/020,138, dated Mar. 23, 2020, Notice of Allowance.
U.S. Appl. No. 16/775,132, dated Mar. 3, 2020, Office Action.
U.S. Appl. No. 15/985,459, dated Apr. 24, 2020, Office Action.
U.S. Appl. No. 15/986,381, dated Jun. 22, 2020, Office Action.
U.S. Appl. No. 15/995,428, dated May 7, 2020, Notice of Allowance.
U.S. Appl. No. 16/518,718, dated May 21, 2020, Office Action.
U.S. Appl. No. 16/775,132, dated Jun. 23, 2020, Office Action.
U.S. Appl. No. 15/995,445, dated Aug. 4, 2020, Notice of Allowance.
U.S. Appl. No. 16/775,132, dated Sep. 18, 2020, Office Action.

(56) References Cited

OTHER PUBLICATIONS

U.S. Appl. No. 15/986,381, dated Nov. 10, 2020, Notice of Allowance.
U.S. Appl. No. 16/518,718, dated Nov. 17, 2020, Office Action.

* cited by examiner

METHOD FOR REQUESTING TRANSPORTATION SERVICES

CROSS REFERENCE TO OTHER APPLICATIONS

This present application is a continuation of U.S. patent application Ser. No. 15/470,553, filed Mar. 27, 2017, which is a continuation of U.S. patent application Ser. No. 15/446,991, filed Mar. 1, 2017, now issued as U.S. Pat. No. 9,826,362, which is a continuation of U.S. patent application Ser. No. 15/429,779, filed Feb. 10, 2017, now issued as U.S. Pat. No. 9,723,447, which is a continuation of U.S. patent application Ser. No. 15/177,762, filed Jun. 9, 2016, now issued as U.S. Pat. No. 9,646,500, which is a continuation of U.S. patent application Ser. No. 14/745,346, filed Jun. 19, 2015, now issued as U.S. Pat. No. 9,392,418, which is a continuation of U.S. patent application Ser. No. 13/413,492, filed Mar. 6, 2012, now issued as U.S. Pat. No. 9,094,787, which is a continuation of U.S. patent application Ser. No. 12/348,850, filed Jan. 5, 2009, now issued as U.S. Pat. No. 8,131,307, which claims priority to U.S. Provisional Patent Applications 61/027,508, filed Feb. 11, 2008 and 61/009,839, filed Jan. 3, 2008. Each of the aforementioned patents and applications are hereby incorporated by reference in their entirety.

FIELD OF THE INVENTION

The present invention relates generally to on-demand transportation of individuals and goods and, more particularly, to a method for requesting transportation using mobile or fixed communication devices capable of geographical location.

BACKGROUND OF THE INVENTION

The efficiency of on-demand transportation services is often limited by the time required to acquire a new customer. For example, taxicabs, on average, are "down" 50% of the time with no passenger to transport. During this down time, taxicab drivers are typically searching for their next passenger by simply looking for a "hailing" signal. In addition to being inefficient, both the driver and passenger are anonymous when a taxicab is "hailed" on the street, and drivers are robbed or killed by unknown passengers. The U.S. State Department has issued warnings to travelers in some foreign countries not to hail taxis in the street; rather, it is recommended that a cab be called from a hotel.

The use of a cell phone by a passenger to request a taxi and by a driver to confirm a pickup allows both to be identified by their cell phone numbers, thereby improving security for both passenger and driver. The use of cell phones that can be identified also permits improved service and management features; for example, a passenger leaving an item in a taxicab can later identify the taxi and recover the item.

The delivery of service information to a mobile device where a person is notified of a personalized service based on previously stored subscriber profile information has been d scribed, an example being hotel selection based on subscriber room requirements. However, the user must already be registered as a subscriber, and must enter subscriber preferences for storage prior to the provision of service information, thereby limiting the usefulness and availability of this service. Location-dependent matching of mobile communication devices where mobile devices are automatically matched by a central server based on user profiles has also been described. Applications of this procedure include a central server matching a passenger requesting taxi service to a nearby available taxi and dispatching a taxi thereto. However, central dispatching of taxi service may not include independently operating taxi drivers. Steps of confirming, canceling, or completing such transactions are not described.

The availability of transportation services that are provided by units operating with a predetermined schedule and route, such as city buses, are limited by the lack of real-time information concerning their actual location.

SUMMARY OF THE INVENTION

Accordingly, it is an object of the present invention to provide a method for requesting transportation services having improved efficiency and security.

Another object of the invention is to provide a method for requesting transportation services from multiple transportation service companies.

Still another object of the invention is to provide a method for communicating real-time location information of a transportation service provider to a potential passengers mobile phone.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for requesting transportation services, hereof, includes: providing a wireless communications network for routing messages; providing a computer for processing information in cooperation with the wireless communications network; sending a request for transportation services to the computer through the communications network using a first communications device having geographic location; sending the geographic location of the first communications device to the computer through the wireless communications network; storing the request and the determined location on the computer; transmitting the stored request and location of the first communications device to at least one transportation provider having a wireless communications device through the wireless communications network; generating a confirmation signal on the wireless communications network from the at least one transportation provider; selecting one transportation provider from the at least one transportation provider; and generating a second confirmation signal from the computer to the transportation requester using the wireless communications network notifying the transportation requester that transportation service has been arranged.

In another aspect of the present invention, and in accordance with its objects and purposes, the method for obtaining time-of-arrival information for at least one transportation vehicle following a predetermined route at a chosen location on the route, hereof, includes: providing a wireless communications network for routing messages; providing a computer for processing information in cooperation with the wireless communications network; sending the geographic location of the chosen location on the route using a first communications device; sending the geographic location for each vehicle of the at least one transportation vehicle at selected time intervals using a wireless mobile communications device located thereon to the computer through the wireless communications network; analyzing the geographic location information at the selected time intervals u ng the computer; comparing the analyzed location information with the scheduled location of the at least one vehicle along the predetermined route; and calculating the time-of-arrival of the at least one vehicle at the chosen location.

Benefits and advantages of the present invention include, but are not limited to, providing a method for safely and efficiently requesting transportation services, whereby new customers may be serviced, requester and transportation provider locations may be viewed in real time on the mobile devices, requesters may be presented with a consolidated view of transportation providers since the transportation providers may be associated with multiple companies, the process may be automated, there is no requirement that the requester subscribes to or otherwise be known to the system in advance of the request, and there is no requirement that the requester provides preference or profile information,

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
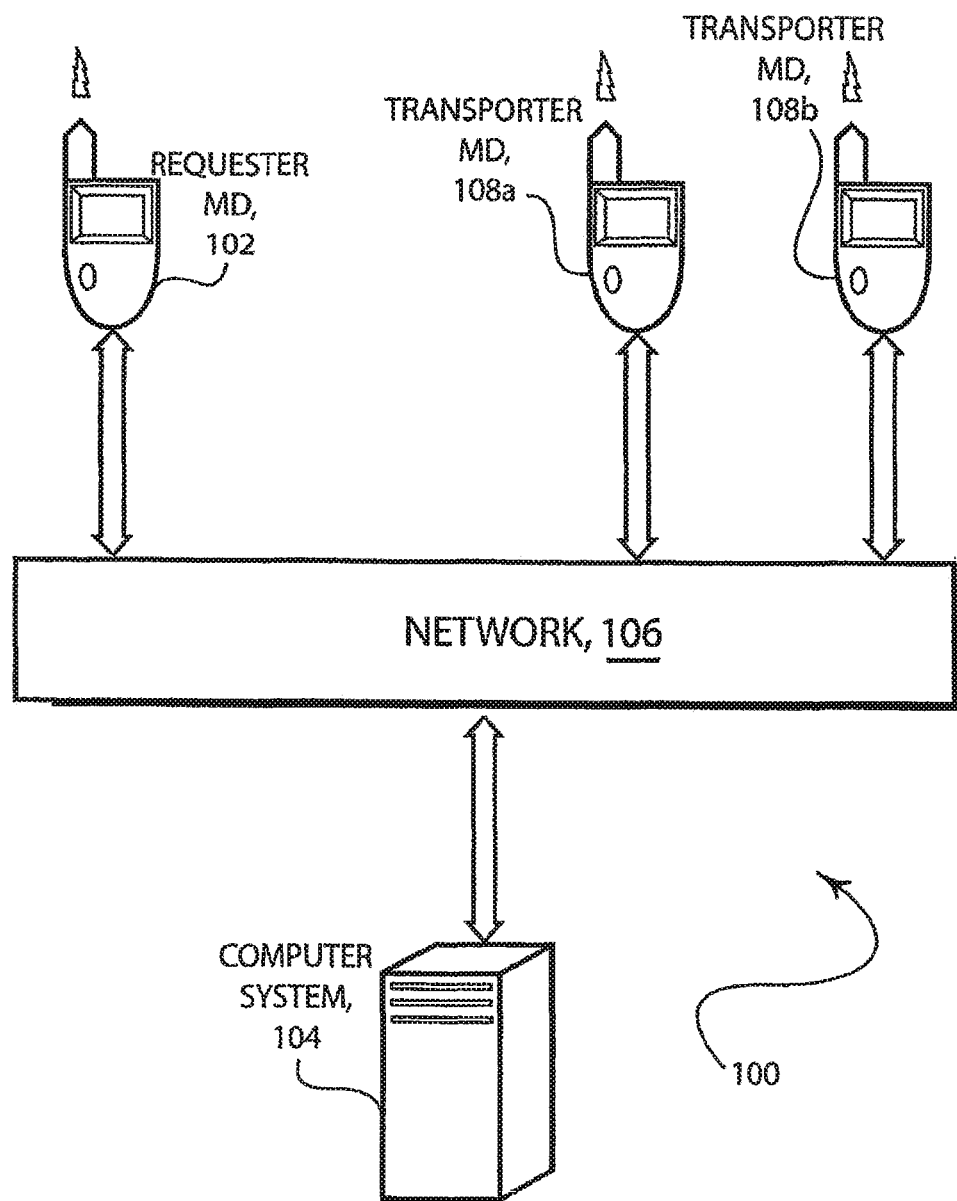
FIG. 1 is a schematic representation of an embodiment of apparatus effective for performing the method of the present invention.

Briefly, the present invention includes a method for safely and efficiently requesting transportation services through the use of mobile communications devices capable of geographic location. Individual or package transportation may be provided. New customers may be efficiently serviced, and the requester and transportation provider locations may be viewed in real time on the mobile devices.

Embodiments of the present method, and an embodiment of the apparatus for implementing the method, hereof, permits a request of transportation services initiated from a smart mobile device (MD) having geographical location determination capability and wireless communication, to be made using a computer and a communication network into which the MD may be connected. It should be mentioned that the request for transportation might be made from another type of communications device, such as a wired telephone or land line, or a laptop or desktop computer, as examples. In the case of the use of a wired telephone, geographic information might be provided from a description of the location by the requester or from a Global Positioning System (GPS) operated by the requester, to an operator who would enter this information into the system. The processing of such requests, and/or other MDs, by the computer system may be automated, as may be the subsequent dissemination of the request by a transportation service provider. That is, from request to completion of service, the present apparatus may be real-time, on-demand, and computer automated, with no required human action other than to perform the initiation, confirmation and service of the request. There is no requirement that the requester subscribes to or otherwise be known to the system in advance of the request. Further, there is no requirement that the requester provides preference or profile information. Requests for transportation services specify the initial pickup location, and may be unpremeditated, or spur of the moment. The requester simply makes a request to be transported (or requests an item to be transported) using a smart MD equipped with software effective for accomplishing this request.

Requesters and transporters may have MDs effective for automatically determining the MDs geographical location, these locations being periodically communicated by means of a communications network to a computer system (CS) and disseminated to both requesters and all transporters (units capable of servicing the request), whereby their movements may be tracked. Potential transporters receive the request and the location of the requester on their mobile devices in real-time (typically within a few minutes), and at least one transporter performs the request either under direction from a dispatch center or the transporter independently decides to confirm and perform the request. The computer system receiving the messages from the transporters and requesters through the CS, including request information, confirmation by the potential transporter, and locations of the MDs, may store this information and track the locations of the requesters and transporters. The computer system may acknowledge the confirmation from a first transporter of a request, by sending an acknowledgement message to both the first confirming transporter and the requester, and sending rejection messages to all other transporters (if any) who subsequently sent confirmations for the same request. Other grounds for choosing a transporter may be envisioned. For example, as will be described hereinbelow, a dispatcher may make this selection. Multiple requests for transportation by a single requester may be rejected by the computer.

In another embodiment of the present invention where transporters are not specifically requested, but rather provide services on a predetermined schedule and route, the at least one transporter MD periodically sends location information to the computer system, but neither receives nor confirms requests. The computer and wireless network system disseminates transporter location information to requester MDs which request transporter location information.

Reference will now be made in detail to the present embodiments of the present invention, examples of which are illustrated in the accompanying drawings. Similar or identical structure is identified using identical reference characters. Turning now to the FIGURES, FIG. 1 is a schematic representation of one embodiment of apparatus, 100, effective for carrying out the steps of embodiments of the method for requesting transportation hereof. Requester MD, 102, may be a wireless mobile hardware device having software capable of communicating information to other mobile devices or computer system (CS), 104, and capable of determining the location of that device. An example of a mobile device is a hand-held programmable cell phone, such as an Apple® iPhone™ or a BlackBerry® Storm™, having geographical position location capability (through the cell system itself (signal triangulation), GPS, or by location specification from the user) and capability to connect to a private computer network or a public network such as the Internet through network, 106. In particular, requests may either be sent to transportation provider (transporter) MDs, 108a or 108b, or CS 104. Requester MD 102 may be tracked in the system by a unique identifier associated with MD 102.

Transporter MDs 108a and 108b may be wireless mobile hardware devices having location determination capability and software for enabling the device to communicate information with other mobile devices and with CS 104 through wireless network 106, whereby requests for transportation may be received. Such requests may be textually listed and/or displayed on a geographical map, and CS 104 and/or the requester MD 102 may be contacted confirming for CS 104 or requester MD 102 that the transportation provider will service the request (confirmation of request). An example of this device may also be a hand-held, programmable cell phone having geographical position location capability, and the capability to connect to a private computer network or a public network such as the Internet through wireless network 106, whereby messages may be transmitted to other MDs or a CS. Transporter MDs may be tracked by system 100 using a unique identifier associated with that MD.

It should be mentioned that requester MD 102 and transporter MDs 108a and 108b, may have map or textual display capabilities.

Network 106 may be a communications network effective for interconnecting computers and permits transfer of data between computers which may be a combination of land-based and wireless connections. The network may be a private network whose nodes are effective for carrying out the steps of embodiments of the method of the present invention, or an existing public network such as the Internet. Computer System (CS) 104 may be a computer system (hardware and software) for receiving and storing all requests, receiving and storing all transportation provider locations/activities, and having the capability of routing information to requester MDs, transportation provider MDs or a system for dispatching transportation services. Computer system 104 may be a computer node of a private computer network or a public network such as the Internet, may include multiple computers connected by an internal network, separate from network 106, or include transportation provider MDs connected using a private or public network.

In operation, requester MD 102 may send a request and its location to computer system 104 through network 106, CS 104 receiving the request and all locations of transportation provider MDs 108a and 108b. Computer System 104 may forward the request to all transportation provider MDs, where one of the transportation providers decides to service the request. The request status is then updated in CS 104, and MDs 108a and 108b may be notified of the change in status.

A dispatch system may be connected to network 106 (not shown in FIG. 1 hereof), including an additional computer, software, and storage, for receiving requests, cancellations, and location information from transportation providers and requesters. In addition, the dispatch system may receive requests, cancellations, and location information input by operators receiving requests from sources including telephone call-ins. The dispatch system upon receipt of such request, and upon action by an operator, may transmit a confirmation message to the requester and to a transporter with the purpose of directing that transporter to perform the request. A plurality of dispatch components may be connected to network 106.

Figure 2:
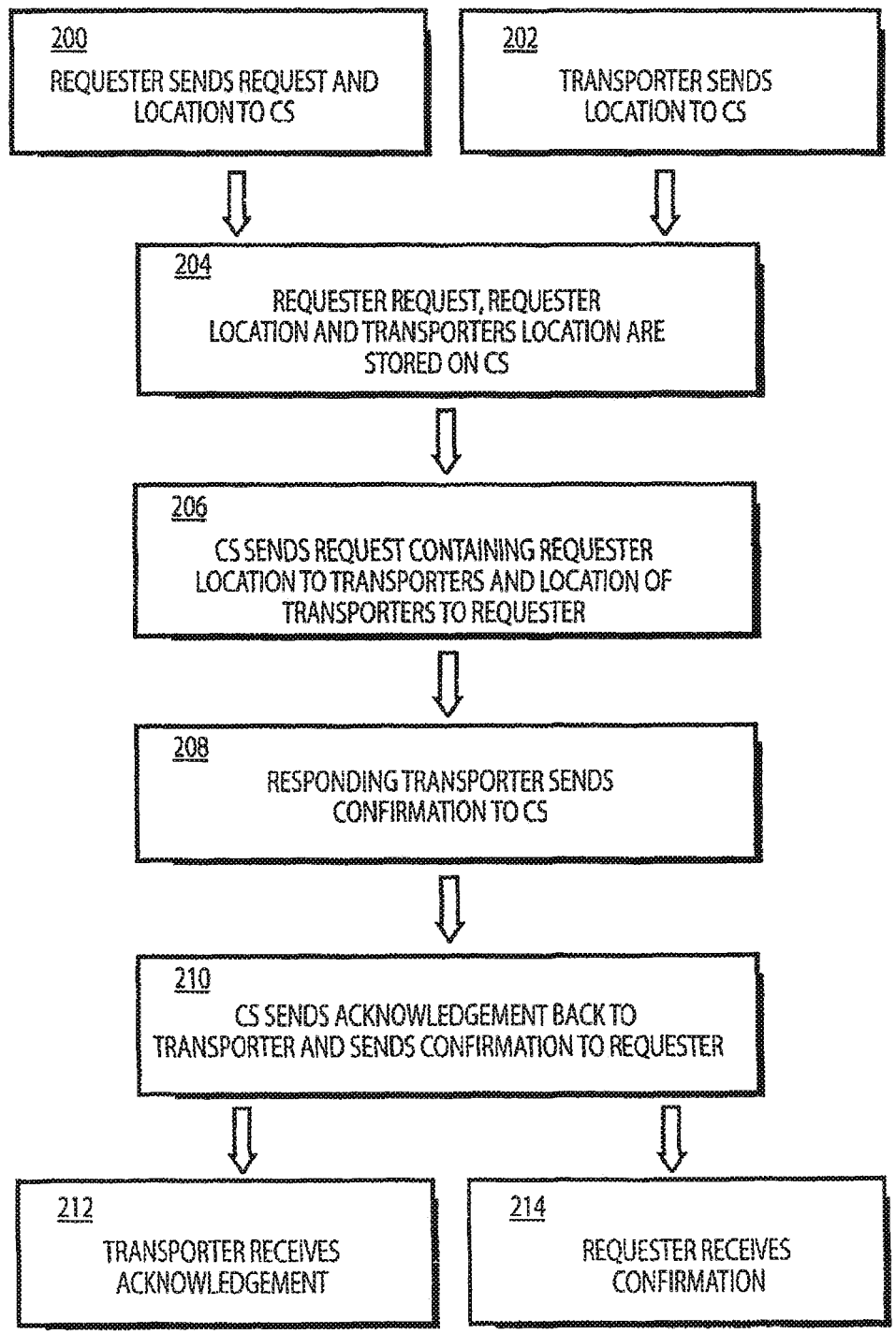
FIG. 2 is a flow diagram illustrating a typical request for transportation services using the apparatus illustrated in FIG. 1 hereof in the absence of a dispatcher.

FIG. 2 is a flow diagram illustrating a typical request for transportation services using the apparatus illustrated in FIG. 1 hereof in the absence of a dispatcher. A request, 200, from a requester MD, which may be a cell phone, is communicated to the known network address of a computer system (CS). As an example, the CS address may be the URL of a website and the CS and MDs communicate over the Internet with IP addresses. Requests may contain information giving the geographical location and a unique MD identification which may be the MD phone number. The request may contain additional information such as the destination location of the transportation request, the method of payment, and specific characteristics of what is to be transported. Characteristics may also include the number of individuals to be transported, the size and weight of packages to be delivered, a future time for the service to be performed and/or the type of material to be transported. The identification and location may be communicated periodically.

Transporter identification and location is communicated, 202, to the known network address of computer system (CS). The identification and location may be communicated periodically.

The CS stores, 204, the request, requester location and transporter location. The CS storage may contain all requests, requester locations and transporter locations.

The CS forwards, 206, the request and the requester's location to the transporter MDs, and the transporter locations to the requester's MD.

The transporter decides to service request and sends, 208, confirmation of this to the CS. This confirmation identifies the request with the unique MD identification of the requester.

The CS sends, 210, a positive acknowledgement of the transporter confirmation to the transporter MD and a confirmation to the requester if the transporter confirmation is the first confirmation received; otherwise, a negative acknowledgement is sent to the transporter MD. That is, any confirmations for the same request arriving after the first confirmation are rejected.

The transporter MD receives, 212, acknowledgement and commences service. The requester MD receives, 214, confirmation that includes the transporter's identification. At this point, the transporter has received the requester's telephone number and the requester has received the transporter's telephone number which permits voice communication between the two.

In the situation where no transporter is available, or no transporter confirms within a chosen time limit, the requester is notified that the request has timed out.

Additional embodiments of the present invention may include, but are not limited to, the following:

(a) Company Dispatch: a request may be transmitted to a CS using its IP address on the Internet; CS software stores the requests, stores all transporters, and sends the request to a dispatch system which dispatches a transporter to the requester based on operation efficiency (transporter availability, transporter type, company policies, and distance/time of the transporter from the requester), as an example.

(b) Unilateral Service Decision: a request is sent to a CS using its IP address which forwards the request to other mobile devices held by transporters; software on the transporter's MD may display multiple requests on a geographical map so that the transporter can chose a request to satisfy without being instructed by any dispatch component.

(c) Distributed CS: a request is sent to an IP address which is timeshared by the active transporter mobile devices; this embodiment replaces the CS with a distributed network of transporter MDs that accomplish the functions of the CS, the mobile devices themselves carrying the addresses of the other MDs in their network and communicating and synchronizing to complete the required GS tasks in a distributed manner; and (d) Public Transportation on Scheduled Routes: here the transporter is a vehicle traveling along a predetermined scheduled route (examples include subway trains, light rail trains, commuter trains, ferries, trucks, and buses). The transporter's MD may periodically send location data to the CS, the data including the location of the vehicle, a unique identifier of the MD and a time stamp. The real-time route location is disseminated by the CS to user mobile devices who wish to observe the transporter locations.

Message protocols may include message types, formats and rules that are decoded and acted upon by software supporting the computer system arid by software supporting the MDs. Each message is identified with a unique identifier and time stamp. For example, if the MDs 'are cell phones, the unique identifier is the cell phone number. Sample messages types and actions are illustrated in the TABLE.

TABLE

| | |
|---|---|
| Initial | The requester and/or transporter signals initial communication with computer network. |
| Request | The requester sends service request, whereby the request and location information are stored in the computer network; the requester is prevented from sending another request message. |
| Confirm | The transporter sends confirmation and location information for a particular request, whereby the confirmation is stored in the computer; the transporter receive a response to this message containing a positive or negative acknowledgement status, whereby positive acknowledgement is sent only if the transporter is first to confirm, there is no prior dispatch message, and there is no prior requester Cancel; the transporter is prevented from sending another confirm message; upon receipt of positive acknowledgment, the sending of a pickup message is enabled. |
| Pickup | The transporter signals that pickup has occurred and service has begun; enables sending of dropoff message. |
| Dropoff | The transporter signals that dropoff has occurred and service has been completed, wherein the service fare is communicated and whereby the transporter confirm message is erased; this enables a cash or credit information message to be sent. |
| Cash | The requester signals payment by cash which enables the sending of a requester stop message. |
| Credit information | The requester signals payment by credit card; a message containing credit card information is sent which effects a credit card authorization to a merchant bank that will be returned in a subsequent requester and transporter heartbeat message. |
| Requester Cancel | The requester signals cancellation of the previously sent request; a stop message is automatically sent. |
| Transporter Cancel | The transporter signals cancellation of the previously sent confirmation message. |
| Stop | The requester/transporter signals the end of the communication with network, whereby any request and location information is erased from storage. |
| Requester Heartbeat | Message periodically sent by requester MD with information including requester's most recent location, whereby the location is stored in the computer; the requester receives responses to this message type containing information including location of transporters, the identity of the transporter acknowledged to service request, service fare, and credit card authorization status. |
| Transporter Heartbeat | Message periodically sent by transporter MD with information including the most recent location, whereby the location is stored in the computer; the transporter receives a response to this message type containing information including location of requesters, payment type of cash or payment type of credit card, and authorization status. |
| Dispatcher Get Information (optional) | Message periodically sent by the dispatcher; the dispatcher receives a response to this message type containing information including location of requesters and transporters. |
| Dispatcher Request (optional) | The dispatcher sends a service request from a requester who placed the request from a telephone, whereby the request and location information is stored in the computer network. |
| Dispatch (optional) | The dispatcher signals that the transporter is to pick up the requester, wherein the requester and the transporter are identified; the dispatcher is prevented from sending another dispatch message identifying the same requester or transporter; the dispatcher receives a response to this message type containing a positive or negative acknowledgement, whereby a positive acknowledgement is sent only if there are no other prior dispatch messages identifying the same requester or transporter, there are no confirm messages of the identified requester's request, and there are no confirm messages from the same transporter. |

Having generally described embodiments of the present invention, the following EXAMPLES provide additional details thereof.

Example 1

Figure 3:
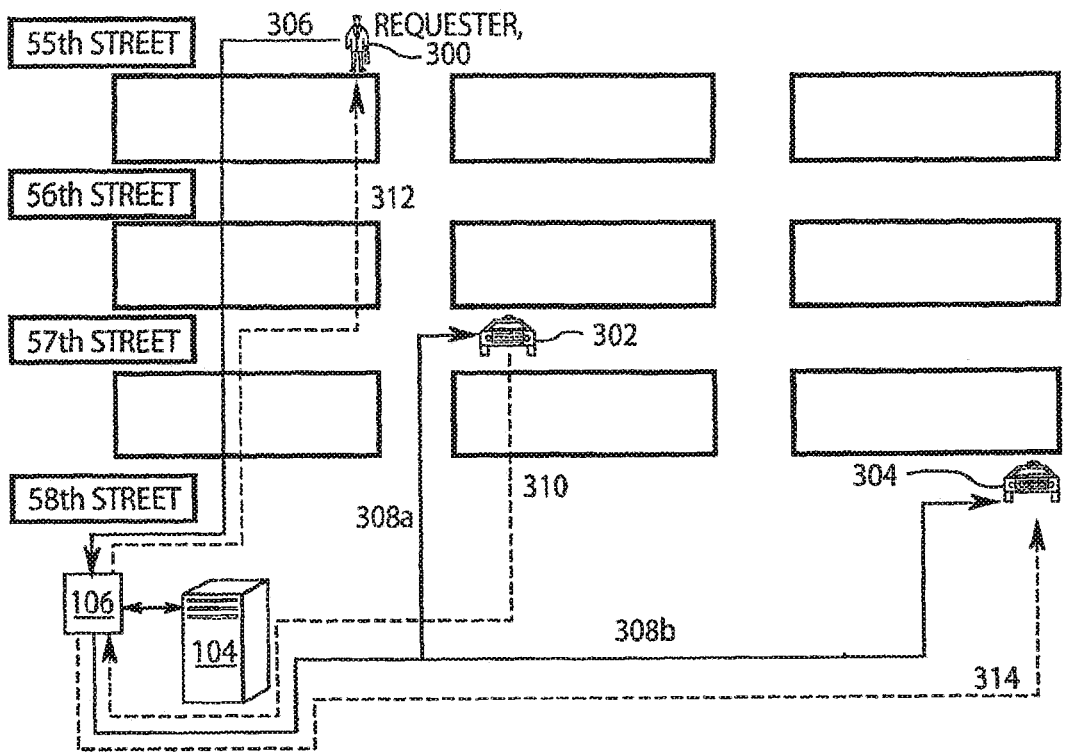
FIG. 3 illustrates an application of the present invention to requesting transportation services from a taxicab.

FIG. 3 illustrates an application of the present invention to requesting transportation services from a taxicab, without the services of a dispatcher. Requester 300, located on 55th Street, wishes to acquire the services of a taxi, although no taxicab is visible to requester 300. The MDs of taxis 302 and 304 automatically and periodically wirelessly communicate their location information to CS 104 through network 106. The request for transportation services from requester 300 is achieved by the requester pushing a button on his or her programmable cell phone, and in step 306, the "hail a taxi" request is sent to computer system CS 104 which is receiving and tracking all active taxi locations. In steps 308a and 308b, the request is simultaneously forwarded to taxis 302 and 304, respectively. It should be mentioned, that all taxis in a county, city or borough, depending on the geographical size of these administrative entities, might receive the request. In step 310, taxi 302 decides to pick up requester 300 and sends a confirming signal to CS 104. In step 312, CS 104 confirms to requester 300 that a taxi is on the way. Computer system 104 also communicates the confirmation to taxi 304 in step 314. As stated hereinabove, multiple requests from requester 300 would be rejected by CS 104. Additionally, location information for taxi 302 may be provided to requester 300.

Figure 4:
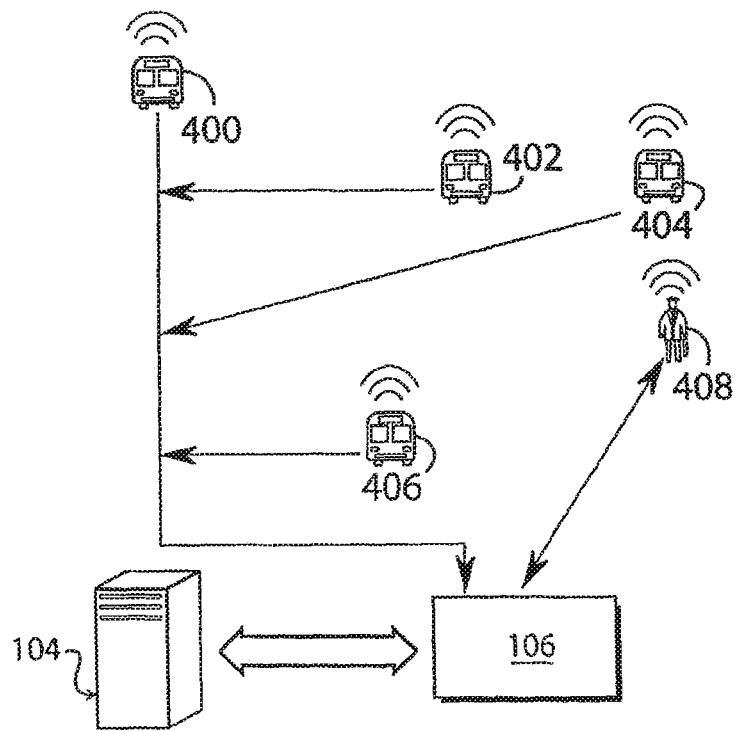
FIG. 4 illustrates an application of the present invention to a traveler interested in using a city bus system.

FIG. 4 illustrates an application of the present invention to a traveler interested in using a city bus system. In this application, city buses, 400, 402, 404, and 406 periodically transmit their geographic locations using MDs thereon to a computer 104 through wireless network 106. Computer 104 analyzes the time-varying geographic location data, matches the locations with bus schedules, and computes times-of-arrival and other route information. This information may be transmitted to traveler 408 where it is displayed on his or her cell phone in real time.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A non-transitory computer readable storage medium comprising instructions that, when executed by at least one processor, cause a computing device to:
   receive, through a wireless communications network, a request for transportation services from a first communications device of a transportation requester;
   send the request for transportation services to a plurality of transportation providers having wireless mobile communications devices through the wireless communications network;
   receive a plurality of confirmation signals from the wireless mobile communications devices of the plurality of transportation providers, the plurality of confirmation signals comprising a first confirmation signal sent first by a transportation provider and additional confirmation signals sent by other transportation providers subsequent to the first confirmation signal; and
   select the transportation provider from the plurality of transportation providers based on the first confirmation signal associated with the transportation provider being sent first.

2. The non-transitory computer readable storage medium of claim 1, further comprising instructions that, when executed by the at least one processor, cause the computing device to select the transportation provider further based on at least one chosen criterion.

3. The non-transitory computer readable storage medium of claim 1, further comprising instructions that, when executed by the at least one processor, cause the computing device to select the transportation provider utilizing a dispatcher.

4. The non-transitory computer readable storage medium of claim 1, further comprising instructions that, when executed by the at least one processor, cause the computing device to notify the transportation requester of a time-of-arrival of the transportation provider.

5. The non-transitory computer readable storage medium of claim 1, wherein the transportation services comprise one or more of transportation of at least one individual or transportation of at least one package.

6. The non-transitory computer readable storage medium of claim 1, further comprising instructions that, when executed by the at least one processor, cause the computing device to:
   obtain an identity of the transportation requester; and
   store the identity of the transportation requester.

7. The non-transitory computer readable storage medium of claim 1, further comprising instructions that, when executed by the at least one processor, cause the computing device to notify each transportation provider of the plurality of transportation providers that the transportation provider has been selected.

8. The non-transitory computer readable storage medium of claim 1, further comprising instructions that, when executed by the at least one processor, cause the computing device to track a location of the transportation requester using a geographic location of the first communications device.

9. The non-transitory computer readable storage medium of claim 1, further comprising instructions that, when executed by the at least one processor, cause the computing device to send, to the first communications device for storage, a telephone number of a wireless mobile communications device of the transportation provider, whereby the transportation requester can identify the transportation provider subsequent to performance of the transportation services.

10. The non-transitory computer readable storage medium of claim 1, wherein the instructions, when executed by the at least one processor, cause the computing device to cause a wireless mobile communications device of the transportation provider to display a geographic location of the first communications device on a geographic map.

11. A system for managing transportation services, the system comprising:
   at least one processor;
   a non-transitory computer readable storage medium comprising instructions that, when executed by the at least one processor, cause the system to:

receive, through a wireless communications network, a request for transportation services from a first communications device of a transportation requester;

send the request for transportation services to a plurality of transportation providers having wireless mobile communications devices through the wireless communications network;

receive a plurality of confirmation signals from the wireless mobile communications devices of the plurality of transportation providers, the plurality of confirmation signals comprising a first confirmation signal sent first by a transportation provider and additional confirmation signals sent by other transportation providers subsequent to the first confirmation signal; and select the transportation provider from the plurality of transportation providers based on the first confirmation signal associated with the transportation provider being sent first.

12. The system of claim 11, further comprising instructions that, when executed by the at least one processor, cause the system to select the transportation provider further based on at least one chosen criterion.

13. The system of claim 11, further comprising instructions that, when executed by the at least one processor, cause the system to notify the transportation requester of a time-of-arrival of the transportation provider.

14. The system of claim 11, further comprising instructions that, when executed by the at least one processor, cause the system to notify each transportation provider of the plurality of transportation providers that the transportation provider has been selected.

15. The system of claim 11, further comprising instructions that, when executed by the at least one processor, cause the system to track a location of the transportation requester using a geographic location of the first communications device.

16. The system of claim 11, wherein the transportation services comprise one or more of transportation of at least one individual or transportation of at least one package.

17. The system of claim 11, further comprising instructions that, when executed by the at least one processor, cause the system to send, to the first communications device for storage, a telephone number of a wireless mobile communications device of the transportation provider, whereby the transportation requester can identify the transportation provider subsequent to performance of the transportation services.

18. A method for managing transportation services, the method comprising:

receiving, through a wireless communications network, a request for transportation services from a first communications device of a transportation requester;

sending the request for transportation services to a plurality of transportation providers having wireless mobile communications devices through the wireless communications network;

receiving a plurality of confirmation signals from the wireless mobile communications devices of the plurality of transportation providers, the plurality of confirmation signals comprising a first confirmation signal sent first by a transportation provider and additional confirmation signals sent by other transportation providers subsequent to the first confirmation signal; and selecting the transportation provider from the plurality of transportation providers based on the first confirmation signal associated with the transportation provider being sent first.

19. The method of claim 18, further comprising tracking a location of the transportation requester using a geographic location of the first communications device.

20. The method of claim 19, further comprising causing a wireless mobile communications device of the transportation provider to display a geographic location of the first communications device on a geographic map.

* * * * *